United States Patent [19]

Savage

[11] Patent Number: 4,812,323

[45] Date of Patent: Mar. 14, 1989

[54] METHOD FOR PREPARING A CUP-SHAPED COOKIE

[75] Inventor: Don H. Savage, Sandy, Utah

[73] Assignee: Cookie Cup International, Sandy, Utah

[21] Appl. No.: 938,575

[22] Filed: Dec. 5, 1986

[51] Int. Cl.⁴ ............... A21D 8/06; A21D 13/08
[52] U.S. Cl. ................... 426/496; 249/122; 426/138; 426/139; 426/549
[58] Field of Search ............ 426/138, 139, 549, 282, 426/283, 279, 514, 280; 425/358, 346; 249/176, 122, 124, 125

[56] References Cited

U.S. PATENT DOCUMENTS

| | | | |
|---|---|---|---|
| 837,344 | 12/1906 | Schiller | 249/176 |
| 1,510,279 | 9/1924 | Huth et al. | 99/439 |
| 1,794,238 | 2/1931 | McKibbin | 426/139 |
| 1,987,993 | 1/1935 | Dicker | 426/139 |
| 2,404,177 | 7/1946 | Jitschmann | 426/139 |
| 2,492,832 | 12/1949 | Barasch | 426/139 |
| 3,296,956 | 1/1967 | Turner | 249/125 |
| 3,590,728 | 7/1971 | Stanley | 99/439 |
| 4,205,091 | 5/1980 | Van Horne | 426/138 |
| 4,348,949 | 9/1982 | Selleck | 426/94 |

*Primary Examiner*—Donald E. Czaja
*Assistant Examiner*—Mary S. Mims
*Attorney, Agent, or Firm*—Thorpe, North & Western

[57] ABSTRACT

A cookie having a cupped shape facilitating placement of a scoop of ice cream or other confectionary substance therein is disclosed. The cookie is prepared by applying a differential cooking environment wherein the upper mold receives a lesser quantity of cooking heat and the lower mold receives a comparative larger quantity of cooking heat to develop an appropriate balance of baking reaction wherein gas formation within the cookie batter is controlled to develop an acceptable cookie texture and quality.

5 Claims, 1 Drawing Sheet

METHOD FOR PREPARING A CUP-SHAPED COOKIE

BACKGROUND OF THE INVENTION

1. Field of Invention

This invention pertain to a cookie which is uniquely configured in a somewhat hemispherical shape, thereby being adapted to contain a scoop of ice cream or other confection filler. The invention more specifically relates to a cup-shaped cookie and device and method for preparation thereof, wherein the cup shape of the cookie is developed by a baking enclosure which provides differential heating at the cookie surfaces.

2. Prior Art

Ice cream is typically eaten from a cup or container which is discarded, or from a cone which may be eaten with the ice cream. U.S. Pat. No. 1,794,238 by McKibben discloses one of many edible containers for ice cram. The cone material is typically thin in structure and has a wafer-like texture. U.S. Pat. No. 1,813,099 discloses another configuration for an edible ice cream container which is donut-shaped. Here again, the material utilized is wafer-like batter such as is typically used in ice cream cone compositions. These disclosures illustrate the prior art use of molds in forming various shapes for ice cream cone structures. In this type of product, the batter is cooked to its final form, and then the ice cream is added without further treatment or baking.

Another type of product involves the enclosure of ice cream within an edible container which is then cooked or otherwise heated. Such items would be generally classified as pastries and are illustrated by the following U.S. Patents:

| | |
|---|---|
| 1,445,187 | Vaughan |
| 2,404,177 | Jetschmann |
| 4,171,380 | Forkner |
| 4,020,188 | Forkner |

These ice cream products involve the use of dough material which fully encloses and seals the ice cream, permitting it to be quickly deep fat fried without causing the ice cream to excessively melt during the cooking process. Typically, the pastry material is uncooked until the ice cream is actually enclosed and the combination is dropped in frying oil or in a hot oven. The Vaughan patent illustrates the use of an enclosed cooking shell made of metal for applying rapid heat to the pastry coating. Such baking procedures require very intense heat to quickly cook the pastry without permitting sufficient time to melt the contained ice cream. Such pastry shells are cooked at a uniform rate around the total enclosure, either by the enclosing metal shell or by the surrounding hot grease.

Although pastry-ice cream combinations have gained some popularity, the difficulty of prearation and storage has discouraged broad commercial development and sales. The ice cream cone with its wafer-like material remains the dominant carrier for ice cream sales which involve an edible container.

Another form of ice cream product is represented by the ice cream sandwich. This product includes a flat layer of ice cream pressed between two layers of cookie-like material. More recently, brand names of cookies have been converted to an ice cream sandwich configuration. For example, Oreo (Trademark) cookies have been used to sandwich an ice cream center as a commercial product. The use of cookies with ice cream uniformly utilize flat layers of cookie material with ice cream sandwiched therebetween. This sandwich configuration has been preferred over other shapes because of practical difficulties of preparing cookie materials in nonplaner configurations. Nevertheless, the sandwich has the disadvantage of compressing the ice cream when eaten, often leading to discharge of ice cream around the edges This has perhaps discouraged general use of cookie combinations with ice cream. Those applications which have developed conform to the sandwiched configuration with ice cream being contained between two opposing, flat cookies.

The packaging of conventional "home made" cookie material with ice cream has not evolved from other cookie/sandwich applications. It is well known to those skilled in the art that such cookie dough typically becomes fluid during its cooking process. By cooking on a flat surface, the cookie can be allowed to flow into squares or circles having a uniform thickness. Attempts to bake a cookie in other than flat shape have resulted in poor texture and consistency. This arises, in part, from the changes in viscosity which cookie dough encounteres during the cooking process. Because the fluid dough seeks a common level, it is difficult to have it take any other shape than a planer configuration, except by the use of molds or mandrels.

Examples of configured baking pans which have been used with levening batters are disclosed in the following patents:

| | |
|---|---|
| 1,510,279 | Huth |
| 3,385,205 | McCloud |
| 3,590,728 | Stanley |
| 3,296,956 | Turner |
| 2,833,654 | Sonnenshein et al. |
| 1,293,819 | Lewison |
| 1,588,940 | Smola |
| 4,348,949 | Selleck |

Although the respective disclosures teach shapes which provide upper and lower mold surfaces for confining dough and configuring it to a particular shape, none of these shapes have been successful in developing a cookie texture and configuration. For example, the cup-shaped structures of Huth and Turner develop burnt or overdone areas at the corners Furthermore, the fluid nature of the batter as it is heated often leads to the uneven dispersion of gases through the dough mixture and uneven cooking of the batter. The resultant product is a composite of overdone and undercooked batter segments.

Although some of these molds are suitable for making buns as set forth in McCloud, attempts to process cookie dough in the same mold become fraught with difficulty. Similarly, whereas shapes having thin walls such as ice cream cones may be prepared with concave mold structures, cookies of three or more millimeters requires too much cooking time and develops poor dispersion of gases, with overcooked and undercooked segments. Because of these difficulties, development of nonplanar cookie shapes as ice cream containers has failed to catch the interest of both manufacturer and consumer.

OBJECTS AND SUMMARY OF THE INVENTION

It is therefore an object of the present invention to provide a cookie shell which has a hemispherical, concavo-convex shape with a conventional cookie thickness greater than three millimeters, as contrasted with wafer thicknesses of less than three millimeters.

Another object of the present invention is the preparation of a cookie which retains the uniform texture and composition experienced with flat cookie products yet having the novelty shape of a cup for containing a confectionary material.

A still further object of the present invention is to provide a cookie of popular composition such as oatmeal or chocolate chip, which is shaped in a concavo-convex configuration for containment of ice cream and similar confectionary materials.

Yet another object of this invention is to provide a method for preparing cookies as described in the preceding objects in mass quantity. g A further object of the present invention is to provide a baking enclosure useful for preparing cookies as described in the previous objects.

These and other objects are realized in a cookie of conventional size (at least five centimeters across) and having a substantially uniform thickness of at least three millimeters, yet being shaped in concavo-convex configuration. This concave structure forms a deep cup extending from a top edge of the cookie perimeter to a base portion of interior cookie shell for distance of approximately two centimeters or more. The cookie may be shaped in hemispherical configuration or similar shapes being substantially defined by a radius of curvature for the interior and exterior cookie surfaces. This configuration is characterized by a total absence of corners or points below the top perimeter, thereby providing a cookie of uniform taste and texture.

Such cookies are prepared in a baking enclosure defining a concavo-convex void or cooking space which is formed as a baking pan having a lower support base and plurality of attached concave, lower baking molds which are exposed through the support base. These molds are likewise characterized by the absence of corners and points below a top rim thereof and have a predetermined lower mold rate of heat transfer or thermal conductivity. A mating upper mold adapted for nesting attachment to the lower mold of the baking pan is formed of an upper support base and plurality of upper convex molds which extend downward from the upper support base in positions corresponding to relative locations of the lower concave molds. These upper convex molds likewise are free of corners and points and provide an upper mold heat transfer rate or thermal conductivity which is lower than that of the lower molds. This difference results in a temperature difference between the cooking surface of the upper mold and that of the lower mold, creating a differential cooking environment which facilitates uniform dispersion of gases and uniform cooking of batter to develop traditional cookie texture and taste throughout the concavo-convex cookie structure.

The present disclosure also sets forth a preferred method of preparing such concavo-convex shaped cookies involving the steps of preparing cookie batter and the baking enclosure, applying a differential cooking environment to the cookie batter wherein a greater quantity of cooking heat is applied at an interior face of the lower mold as compared to a lesser quantity of cooking heat applied to the interior face of the upper mold, maintaining this differential cooking environment during the cooking process, and then separating the upper and lower molds to permit removal of the cooked batter. The described method of applying a differential cooking environment yields a faster rate of gas formation at the interior face of the lower mold and a slower rate of gas formation at the face of the upper mold which operate in a complementary fashion to develop a uniform cooking rate and preferred texture which are expected of cookie compositions. Such methods are uniquely adapted for the variable viscosity changes which occur with cookie batter during the baking stage.

Other objects and features of the present invention will be apparent to those skilled in the art in view of the following detailed description, taken in combination with the accompanying drawings.

DETAILED DESCRIPTION OF THE INVENTION

Figure 1:
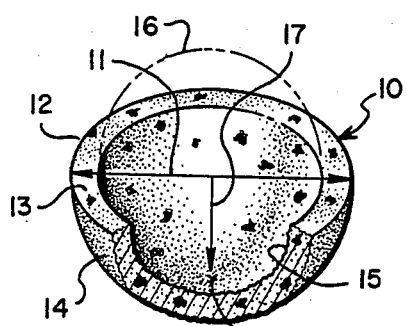
FIG. 1 illustrates a cup shaped cookie having a configuration in accordance with the present invention.
Figure 2:
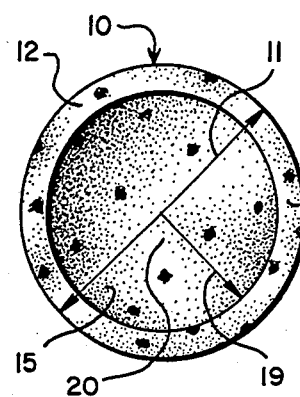
FIG. 2 is a top view of the cookie configuration shown in FIG. 1.
Figure 3:
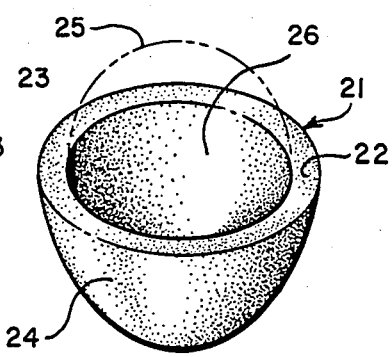
FIG. 3 shows an additional cookie configuration which is slightly elongated from the spherical shape of FIG. 1.

Referring now to the drawings:

FIG. 1 illustrates a uniquely shaped cookie comparable in texture and quality to traditional planer cookies made of chocolate chip, oatmeal, sugar cookie composition, and other "home made" type cookie materials. This cookie is shaped in a general hemispherical configuration such as is developed by a plane intercepting a portion of a spherical structure. As used in this application, spherical and hemispherical are used within the general context of a sphere meaning any rounded body approximately of the form of a globular shell. Exact equidistance of the sphere shell from the center is not critical, nor is it intended by reference to such geometric terms Rather, the general spherical shell configuration is intended to include rounded bodies which do not have points or corners, except at a point of intersection of a plane with the spherical body. Accordingly, FIGS. 1 and 2 illustrate a geometric hemispherical shape, whereas FIG. 3 illustrates a general hemispherical shape in which the shell body is slightly elongated in a somewhat elliptical configuration.

The preferred embodiment of the cookie 10 illustrated in FIG. 1 is characterized by an outer diameter 11 having a length of at least approximately 5 centimeters across its widest perimeter 12 at the top edge 13 of the cookie. An exterior surface 14 and interior surface 15 provide a uniform cookie thickness of at least approximately 5 milimeters. A specific popular cookie size is a hemispherical shell with an outer diameter of approximately 7.5 centimeters and a shell thickness of 8 to 9 milimeters. Values of cookie diameter and thickness may be selected, but will generally fall within the range wherein the concave interior side 15 of the cookie has a spherical radius of curvature approximately within the range of 2 to 4 centimeters.

One aspect of novelty of this cookie configuration is its concavo-convex shape which comprises no more than a half portion of a spherical shell which is intercepted by a plane to form the top edge 13. Providing the largest opening at its top edge 13 enables insertion of a scoop of ice cream 16 to be directly positioned within the concave space of the cookie. This forms a cup-shaped configuration with no points or edges, except for the top edge 13. The depth of the cup or shell 17 extending from the diameter 11 to the base of the cup is at least 2 centimeters to provide an effective container for the ice cream or other confectionary material carried therein. Utilizing a vertical depth 17 of at least 2 centimeters avoids the need of adopting prior art sandwich configurations where the ice cream is positioned between two opposing cookie faces. Instead, the cup configuration is used in a similar manner as a conventional cone, allowing the person to eat the ice cream down to the top edge level of the cookie, thereafter eating both the cookie and contained ice cream together.

Ideally, the concave interior configuration 15 will conform to the configuration of an ice cream scoop so that the ice cream is fully seated in the cup interior. A full hemispherical shell provides convenient means for the consumer to hold the ice cream without soiling hands or clothing with melting droplets. This does not mean that the cupped configuration could not be less than a half portion of the spherical shell. Indeed, there may be specific applications wherein the vertical depth 17 from the top edge to the base portion 20 of the interior side 15 extends a distance which is substantially less than an interior radius of curvature 19 of the hemisphere portion.

Other cup-shaped configurations are represented by FIG. 3. This embodiment shows a cookie shell 21 having a top edge 22, an interior, concave side 23 and exterior convex side 24. A scoop of ice cream 25 is illustrated in phantom line in its inserted position within the cavity 26 of the cookie shell.

Figure 4:
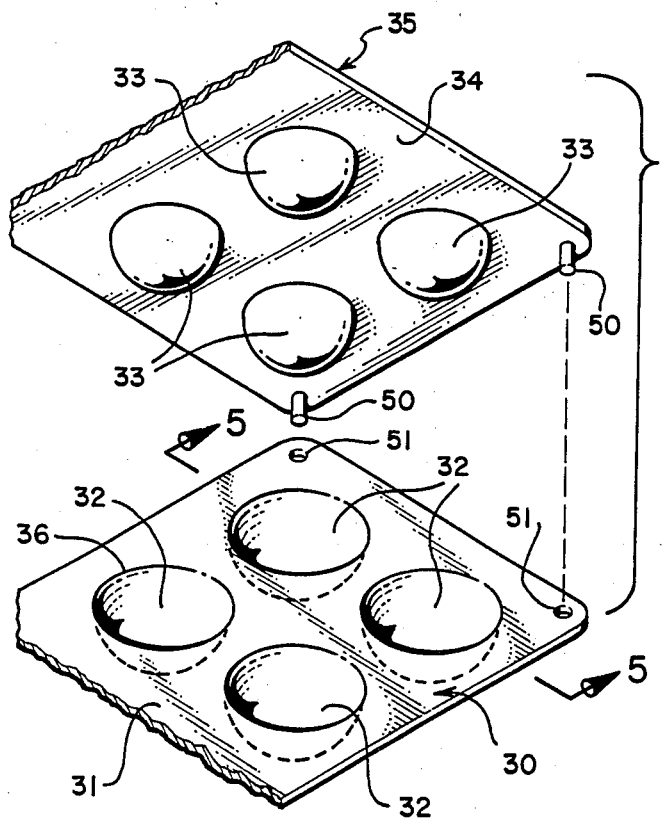
FIG. 4 depicts upper and lower molds utilized to prepare cup shaped cookies in accordance with the present inventive method.

The preparation of the concavo-convex shaped cookie is made possible by a unique baking enclosure. This enclosure is illustrated in FIG. 4 and comprises a concavo-convex baking pan 30 which is formed of a lower support base 31 and a plurality of attached concave, lower baking molds 32. The concave openings of the respective molds 32 are exposed through the support base 31 to enable emplacement of cookie dough therein and insertion of an upper mold 33 which nests in the lower baking molds 32.

The upper mold members 33 are attached to an upper support base 34 and collectively comprise the upper mold 35. The upper molds 33 are formed with a convex face extending downward from the upper support base in positions corresponding to relative locations of the lower concave molds 32.

Both the lower, concave baking molds 32 and the upper convex molds 33 are characterized by the absence of corners and/or points in the main body thereof. For the lower molds, the main body comprises that portion of the structure suspended downward from the lower support plate 30. Obviously, the perimeter 36 constitutes a corner; however, it is at the level of the top edge 13 of the cookie as shown in FIG. 1. Accordingly, the portion below the perimeter 36 is characterized by the referenced absence of corners and/or points. Similarly, the main body of the upper convex molds constitutes that part of the mold suspended downward from the face of the upper support base 34. It is the absence of points and corners in the respective cooking surfaces on the upper and lower molds which enables the cookie to bake at a uniform rate without localized burning of the cookie dough. This factor will be discussed later in connection with the method of preparing the referenced cookies.

The upper convex molds 33 are structured with dimensions sufficiently smaller than corresponding dimensions of the lower molds 32 to develop a space between the nested upper and lower molds which provides a cupped baking void. This void is shown as item 40 in FIG. 5. The top side of this void comprises the face 41, the opposing lower side 42 of the lower molds defines the lower boundary of the referenced baking void. The remaining upper rim of the void is closed by a flat, top wall 44 of the upper support base immediately around the perimeter 45 of the upper mold 33. This top wall 44 rests against the top surface 45 of the lower support base to thereby seal off the gap existing between the two nesting molds.

Figure 5:
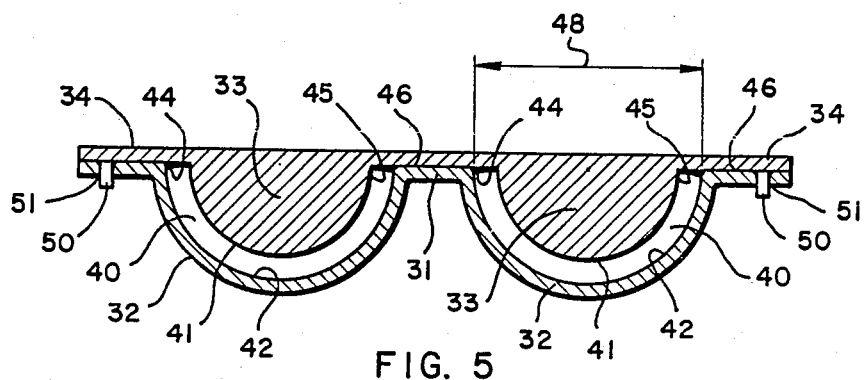
FIG. 5 is a cross section taken along the lines 5—5 of FIG. 4.

The respective upper and lower support bases include means to properly align the nesting upper mold 33 within the concave lower mold 32. FIGS. 4 and 5 disclose one means for fixing and maintaining the proper nested relationship comprising a pair of studs 50 which are journaled in corresponding openings 51. Obviously, the relative placement of studs and openings may vary, provided that two such alignment means exist to prevent rotational displacement of the upper molds and support base with respect to the lower molds.

A significant feature of the proposed baking enclosure is that numerous shapes can be prepared, provided this structure is configured without the detrimental corners and points For example, the hemispherical shell configurations illustrated in FIGS. 4 and 5 may be used to prepare the described cookie structures identified in FIGS. 1 and 2. In addition, a hemielliptical configuration of the upper and lower molds may likewise be adopted. The absence of corners and points provides for uniform dispersion of heat across the respective upper 41 and lower 42 cooking surfaces to enable uniform heat exposure thereat.

To prepare the concavo-convex cookie illustrated in FIG. 1, the diameter across the top rim 48 (FIG. 5) of the lower mold 32 is at least 5 centimeters across its widest perimeter. The baking void 40 is of substantially uniform thickness between the upper 41 and lower 42 mold faces and at least approximately 5 milimeters in distance. The ideal distance between the upper and lower molds in nested configuration is approximately 1 centimeter. The vertical depth from the top face 45 of the lower support base and the lowest base portion of the lower mold 42 would be at least 2 centimeters in length. The spherical radius of curvature for the concave lower mold surface 42 ranges within 2 to 4 centimeters.

Although the absence of corners and points in the respective upper and lower molds is critical, an additional factor of the present invention involves the establishment of a heat differential between the upper surface 41 and lower surface 42 of the respective molds. It has been discovered that if the rate of heat transfer within the upper mold body 33 is approximately within the range of 30 to 60 percent of the rate of heat transfer within the body of the lower mold 32, a cookie configuration can be prepared as described with respect to FIGS. 1 and 2. If the rate of heat transfer within the upper mold body is not less than that of the lower mold body, a uniform texture and cooking rate typically fail. The result is a cookie which may be undercooked in areas around the lower surface and overcooked at the upper or concave portion of the cookie. In addition, formation of gas bubbles from the baking reaction becomes excessive at the top suruface 41, generating an unsatisfactory cookie surface of pits and cracks.

Figure 6:
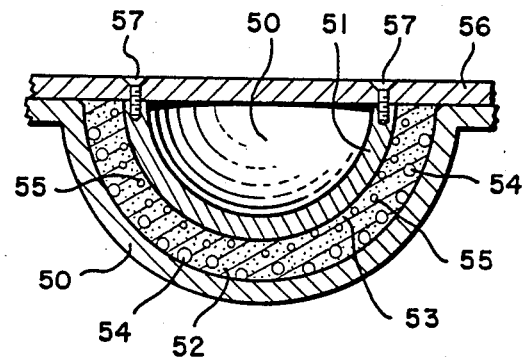
FIG. 6 shows an alternate embodiment of upper and lower baking molds with cooked batter therebetween.

When the rate of heat transfer within the lower concave mols 50 (see FIG. 6) is higher than the rate of heat transfer into the upper mold 51, the cooking reaction within the lower side of the cookie 52 exceeds the cooking rate at the upper side of the cookie 53 and enables proper baking. This is represented in FIG. 6 by the size of bubble formation wherein the faster rate of cooking is exemplified by a larger gas pocket 54, as compared to the smaller pocket formed at the upper surface 53 of the cookie. This differential cooking environment allows preparation of contoured cookie shapes which develop a uniform quality and texture to the baked cookie.

FIGS. 4 and 5 illustrate one baking enclosure configuration which provides differential heat transfer rates into the upper and lower molds. This enclosure is constructed of aluminum. The lower baking pan 30 has a conventional material thickness of 1/16th inch or 0.16 centimeter. A slower rate of heat transfer is developed in the upper mold by structuring a solid core of aluminum as the upper mold body 33. The increased volume of material reduces the heat transfer rate to develop the required differential heating environment. Testing conducted with respect to the embodiment disclosed in FIGS. 4 and 5 generated graphic slopes for the respective bottom plate time versus temperature and top plate time versus temperature. The calculated difference demonstrated that an acceptable cooking environment developed where the rate of heat transfer in the upper mold 33 was equal to approximately 45 percent of the heat transfer rate for the lower mold 32.

FIG. 6 shows an alternative embodiment and means for reducing the rate of heat transfer of the upper mold 51 as compared to the lower mold 50. This is accomplished by utilizing a void space 55 as a core for the upper mold, in contrast to the solid core of aluminum. The insulative properties of the hollow core contribute to a reduced rate of heat transfer from the upper support base 56 into the upper mold 51. This concavo-convex upper mold 51 is coupled to the support base 56 by means of screws 57 or other adhesive or mechanical fastening means. It will be apparent to those skilled in the art that other forms of modified structure may be utilized to reduce heat transfer rates in the upper mold as compared to the lower mold. In addition, selection of materials having different heat conductivity values may be utilized. For example, a teflon upper mold conducts heat at a lower rate than the aluminum material of a lower mold. Tests have confirmed the utility of utilizing these different compositions to reach a desired differential cooking environment at the upper and lower surfaces of the cookie. It will be apparent to those skilled in the art that other composition changes may be applied to realize this heat transfer differential.

An illustrative method of utilizing the subject baking enclosure shown in FIGS. 4, 5 and 6 is provided in connection with the cookie configurations illustrated in FIGS. 1 through 3. This method comprises the steps of first preparing a batter of a desired composition. As has been previously indicated, the unexpected utility of the present invention is its ability to prepare "home style" cookie compositions such as chocolate chip, oatmeal, sugar cookies, etc. A cookie recipe giving proportions whic have proven effective for use as part of the present method is as follows:

|  | grams | % |
| --- | --- | --- |
| Partially Hydrogenated animal and/or vegetable shortening | 130 | 16.2 |
| Brown sugar | 150 | 18.7 |
| Corn syrup solids | 96 | 12.0 |
| Eggs | 75 | 9.4 |
| Vanilla | 2 | 0.25 |
| Salt | 3 | 0.37 |
| Sodium bicarbonate | 2 | 0.25 |
| Wheat flour | 340 | 42.0 |
| Modified Food Starch | 3 | 0.37 |
|  | 801 | 99.5 |

Many recipes may be applied with the structure and method set forth herein. Accordingly, the representative recipe set forth above is not to be deemed as limiting with respect to the subject invention.

The next step is to prepare a baking enclosure such as is illustrated in FIGS. 4 through 6. This enclosure should include a baking void space 40 bounded by upper 41 and lower 42 mold surfaces and having a configuration shaped in a form representing a desired cookie shape. As was previously indicated, the spherical (as defined herein) configuration can be applied for many different cookie shapes in addition to the illustrated shapes of FIGS. 1, 2 and 3.

A small portion of batter is then placed in the lower mold 32 (FIG. 4) and the upper molds 33 are then nested within the lower molds to restrict the cookie shape to the desired configuration.

A differential cooking environment is then applied to the cookie batter through the respective mold faces 33 and 32 wherein a greater quantity of cooking heat is applied at an interior face of the lower mold 32 which is in contact with the batter and a lesser quantity of cooking heat is applied at an interior face of the upper mold 33. This step may also be viewed from a different perspective involving establishing a differential cooking environment wherein a faster rate of gas formation is developed at an interior face of the lower mold, as compared to a slower rate of gas formation developed at an interior face of the upper mold. In each instance, best results will be developed with the viscosity of the batter is controlled and maintained at a sufficient high level to maintain a uniform dispersion of gas within the batter at each of the respective interior faces of the upper and lower molds. The relative viscosity will depend upon the nature of cookie formula utilized, but is within the ability of those skilled in the art and would be difficult to quantitatively define.

The subject differential cooking environment is maintained for a sufficient time to substantially cook the batter to a desired state. The upper and lower molds are then separated for accessing the completed cookie. After the cookie has cooled, ice cream or other confectionary substances may be placed within the-cupped shape of the cookie. The combination provides a delightful mixture of ice cream and cookie in a single, hand-held product. Similarly, puddings and other confections can be placed within the cookie material, providing the benefit of an edible container with the confection.

The unique cupped configuration of this cookie offers many dessert opportunities. Virtually any product which can be molded into a spherical shape or held within a cupped container can now be placed within the edible cookie configuration. It will be apparent to those skilled in the art that the specific example set forth in this disclosure are merely representative of many aspects of the present invention and should not be considered limiting, except to set forth in the following claims.

I claim:

1. A method of preparing a concavo-convex shaped cookie, comprising the steps of:
    (a) preparing a batter which bakes into a cookie;
    (b) preparing a baking enclosure to receive the cookie batter, said enclosure including a baking void space bounded by upper and lower molds having forms characterized by the absence of interior corners and points and having a configuration shaped in a form representing a desired cupped shape;
    (c) placing a portion of the batter in the baking void space;
    (d) applying a differential cooking environment to the cookie batter comprising a greater quantity of cooking heat at an interior face of the lower mold which is in contact with the batter and a lesser quantity of cooking heat at an interior face of the upper mold which is in contact with the batter;
    (e) maintaining the differential cooking environment for sufficient time to substantially cook the batter; and
    (f) separating the upper and lower molds to permit removal of the cooked batter.

2. A method as defined in claim 1, further comprising the steps of:
    (g) allowing the baked cookie to cool; and
    (h) filling the cookie with a confectionary substance.

3. A method as defined in claim 2, wherein step (h) comprises filling the cookie with ice cream.

4. A method of preparing a concavo-convex shaped cookie, comprising the steps of:
    (a) preparing a batter whose baking process involves formation of gas which is released into the batter;
    (b) preparing a baking enclosure to receive the cookie batter, said enclosure including a baking void space bounded by upper and lower molds and having a configuration shaped in a form representing a desired cookie shape;
    (c) placing a portion of the batter in the baking void space;
    (d) applying a differential cooking environment to the cookie batter wherein a faster rate of gas formation is developed at an interior face of the lower mold which is in contact with the batter and a slower rate of gas formation is developed at an interior face of the upper mold which is in contact with the batter;
    (e) maintaining the differential cooking environment for sufficient time to substantially cook the batter; and
    (f) separating the upper and lower molds to permit removal of the cooked batter.

5. A method as defined in claim 4, further comprising the step of controlling and maintaining sufficient viscosity of the batter within the differential cooking environment to maintain a uniform dispersion of gas within batter at each of the respective interior faces of the upper and lower molds.

* * * * *